US007809789B2

(12) United States Patent
Shuster

(10) Patent No.: US 7,809,789 B2
(45) Date of Patent: Oct. 5, 2010

(54) MULTI-USER ANIMATION COUPLED TO BULLETIN BOARD

(76) Inventor: Brian Mark Shuster, P.O. Box 11289, Zephr Cove, NV (US) 89448

( * ) Notice: Subject to any disclaimer, the term of this patent is extended or adjusted under 35 U.S.C. 154(b) by 459 days.

(21) Appl. No.: 11/924,430

(22) Filed: Oct. 25, 2007

(65) Prior Publication Data
US 2009/0112906 A1 Apr. 30, 2009

(51) Int. Cl.
*G06F 15/13* (2006.01)
(52) U.S. Cl. .................. 709/203; 709/204; 709/205; 709/223; 345/473; 345/474
(58) Field of Classification Search ............ 709/203, 709/204, 206, 223; 345/473, 474
See application file for complete search history.

(56) References Cited

U.S. PATENT DOCUMENTS

| 6,219,045 | B1 | 4/2001 | Leahy et al. | |
|---|---|---|---|---|
| 6,381,444 | B1 | 4/2002 | Aggarwal et al. | |
| 6,493,001 | B1 * | 12/2002 | Takagi et al. | 715/759 |
| 6,512,520 | B1 * | 1/2003 | Naka et al. | 345/473 |
| 6,734,885 | B1 * | 5/2004 | Matsuda | 715/848 |
| 6,767,287 | B1 | 7/2004 | Mcquaid et al. | |
| 2001/0051989 | A1 | 12/2001 | Moncreiff | |
| 2002/0062348 | A1 | 5/2002 | Maehiro | |
| 2003/0039945 | A1 | 2/2003 | Dang et al. | |
| 2003/0083922 | A1 | 5/2003 | Reed | |
| 2003/0139938 | A1 | 7/2003 | Meyers | |
| 2003/0151605 | A1 | 8/2003 | Dominici | |
| 2004/0015549 | A1 | 1/2004 | Saruhashi et al. | |
| 2004/0030781 | A1 | 2/2004 | Etesse et al. | |
| 2004/0235564 | A1 | 11/2004 | Booth | |
| 2005/0026692 | A1 | 2/2005 | Dyl | |
| 2005/0044005 | A1 | 2/2005 | Giannini | |
| 2006/0089873 | A1 | 4/2006 | Stewart, Jr. et al. | |
| 2006/0119598 | A1 | 6/2006 | Littlefield | |
| 2006/0287072 | A1 | 12/2006 | Walker et al. | |
| 2007/0011273 | A1 | 1/2007 | Greenstein et al. | |

(Continued)

FOREIGN PATENT DOCUMENTS

WO WO 2008/109798 9/2008

OTHER PUBLICATIONS

U.S. Appl. No. 60/189,845, filed Mar. 16, 2000, Harron et al.

*Primary Examiner*—Jinsong Hu
(74) *Attorney, Agent, or Firm*—Connolly Bove Lodge & Hutz LLP; Jonathan A. Jaech

(57) ABSTRACT

A multi-user animation process receives input from multiple remote clients to manipulate avatars through a modeled 3-D environment. Each user is represented by an avatar. The 3-D environment and avatar position/location data is provided to client workstations, which display a simulated environment visible to all participants. A text or speech-based bulletin board application is coupled to the animation process. The bulletin board application receives text or speech input from the multiple remote users and publishes the input in a public forum. The bulletin board application maintains multiple forums organized by topic. Access or participation to particular forums is coordinated with the animation process, such that each user may be permitted access to a forum only when the user's avatar is located within a designated room or region of the modeled 3-D environment.

23 Claims, 4 Drawing Sheets

U.S. PATENT DOCUMENTS

| | | |
|---|---|---|
| 2007/0038559 A1 | 2/2007 | Jung et al. |
| 2007/0050716 A1* | 3/2007 | Leahy et al. ................ 715/706 |
| 2007/0130339 A1 | 6/2007 | Alcorn et al. |
| 2007/0162547 A1 | 7/2007 | Ross |
| 2007/0202484 A1 | 8/2007 | Toombs et al. |
| 2007/0220090 A1 | 9/2007 | Hall |
| 2007/0224585 A1 | 9/2007 | Gerteis et al. |
| 2007/0249323 A1 | 10/2007 | Lee et al. |
| 2007/0255805 A1 | 11/2007 | Beams et al. |
| 2008/0064018 A1 | 3/2008 | Griffin |
| 2008/0081701 A1 | 4/2008 | Shuster |
| 2008/0134056 A1 | 6/2008 | Shuster |
| 2008/0158232 A1 | 7/2008 | Shuster |
| 2008/0215994 A1* | 9/2008 | Harrison et al. ............. 715/757 |

* cited by examiner

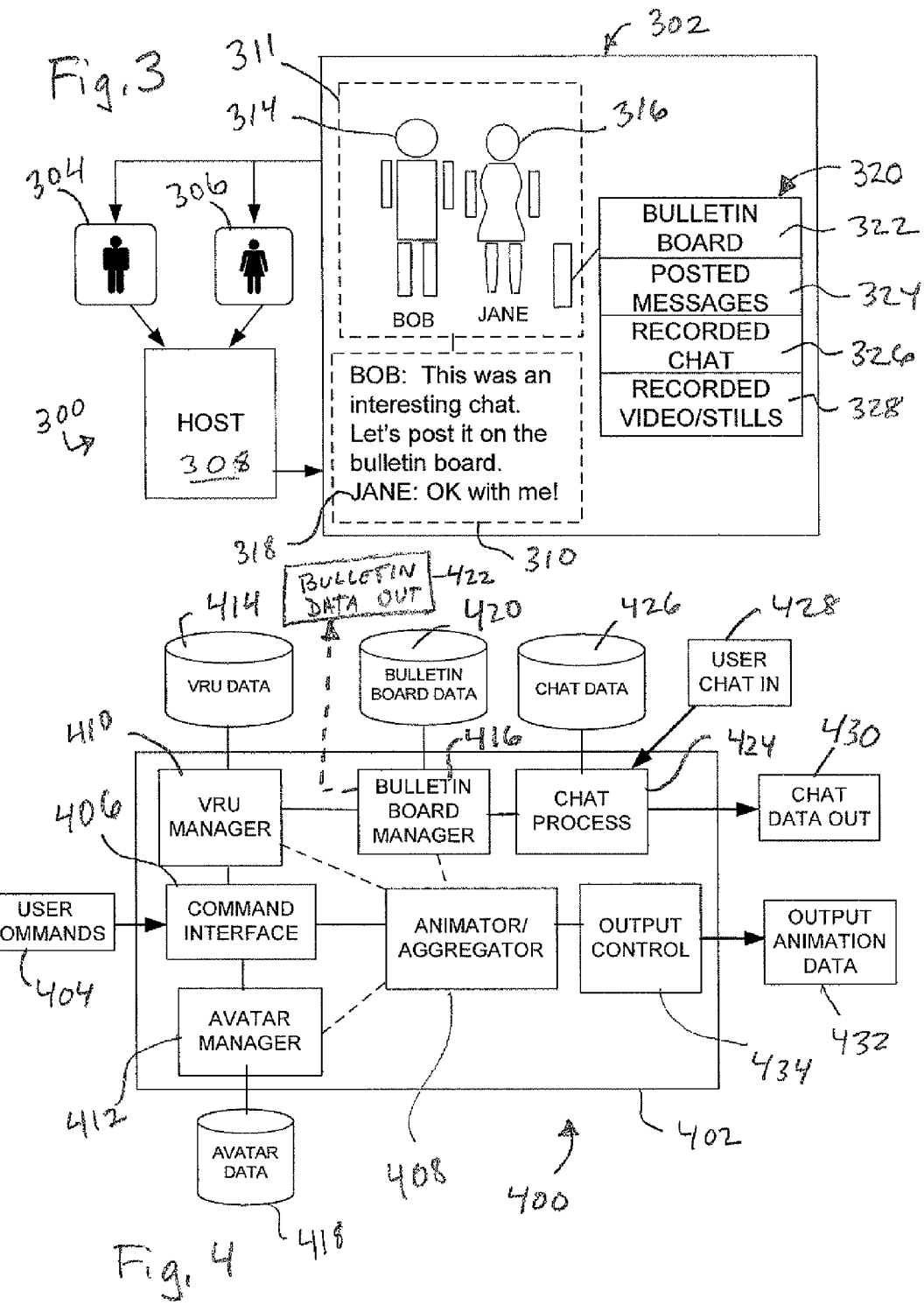

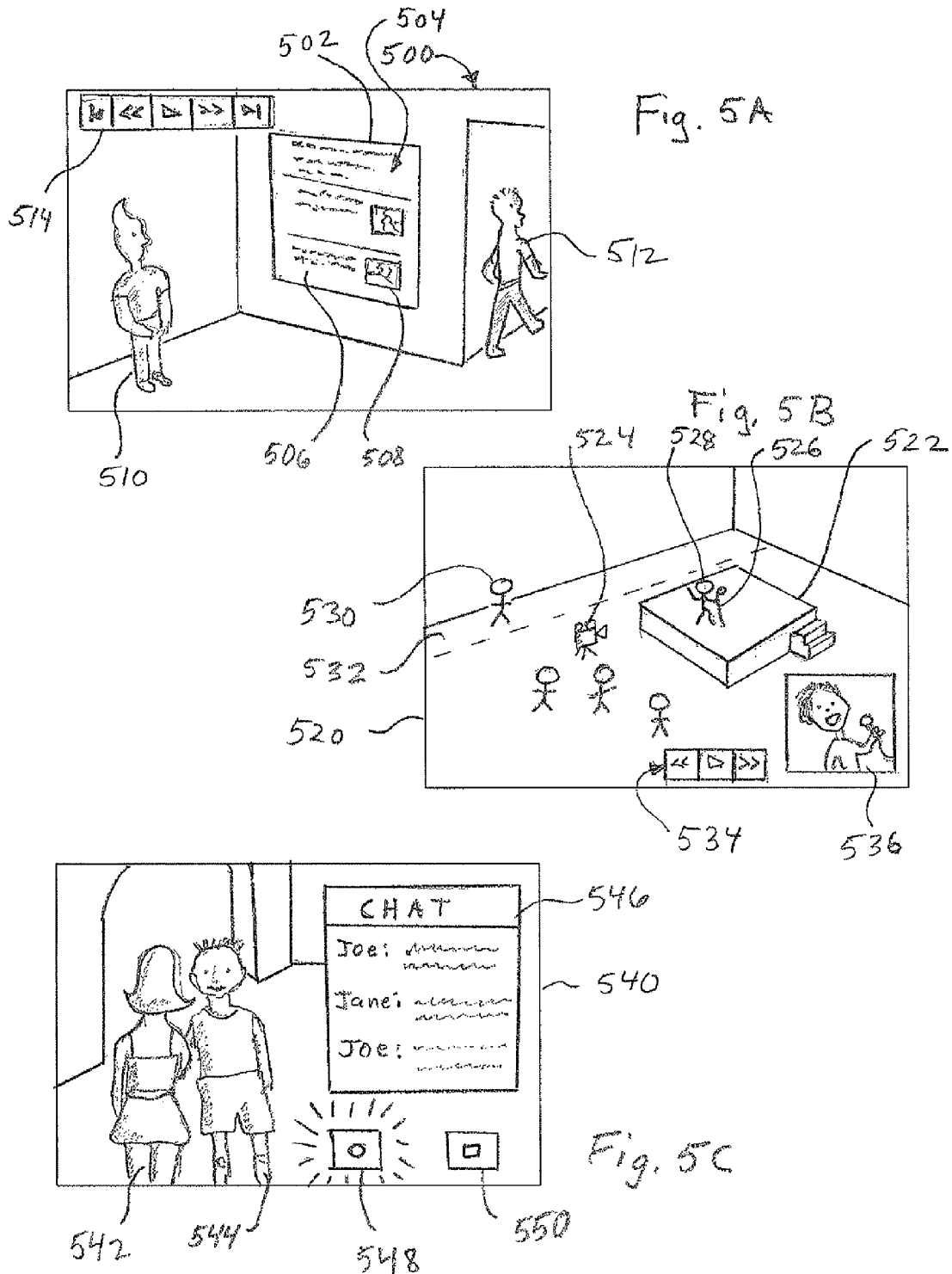

MULTI-USER ANIMATION COUPLED TO BULLETIN BOARD

BACKGROUND

1. Field of the Inventions

The present invention relates to virtual computer-generated environments in which participants are represented by computer-generated avatars, and in particular for environments that simulate an actual 3-D environment and allow for simultaneous participation of multiple players.

2. Description of Related Art

Computer generated virtual environments are increasingly popular diversion for play by multiple remote users within a networked system. The creation of virtualized worlds, three dimensional or otherwise, is well known. Simple text based adventures such as "Zork", early "first person shooter" games such as "Doom", and ultimately numerous highly complex environments such as "Halo" are well known in the art. Various on-line environments are known in which a 3-D physical world (actual or fantasy) is simulated. Environments of this type are sometimes referred to as "virtual reality" or "virtual reality universe" (VRU) environments. In known VRU environments, an actual or fantasy universe is simulated within a computer memory. Multiple players may participate in the environment through a computer network, such as a local area network or a wide area network. Each player selects an "avatar," which may comprise a three-dimensional figure of a man, woman, or other being, to represent them in the VRU environment. Players send inputs to a VRU engine to move their avatars around the VRU environment, and are able to cause interaction between their avatars and objects in the VRU. For example, a player's avatar may interact with an automated entity or person, simulated static objects, or avatars operated by other players. A common style of play is free play in an unstructured environment. In an unstructured environment, there are no game rules or objectives, and players interact with each other via their respective avatars, in a relatively unrestricted, free-play fashion.

It is desirable to provide interesting content within the VRU environment to attract and engage participants, thereby increasing participation and membership in the environments. Unstructured VRU environments accomplish this by facilitating a free play environment in which interest is created by the interaction of independent users. This simulates real-life interaction through voice and text messaging and avatar behavior, and may be considered a core feature of VRU environments. Such non-scripted interaction may be considered a form of user-supplied content that may be of interest to others in the environment. Additionally, predetermined content may be provided in the environment for passive interaction. Likewise, robot avatars that are programmed to interact with human-operated clients in a automatic fashion may be provided. While all of these methods are useful for their intended purposes, unstructured VRU environments suffer from the drawback of being highly dependent on temporal, client-controlled input that may determine essential characteristic of a VRU environment at various periods of time.

In other words, a user's experience in the VRU environment may be highly dependent on factors beyond the control of the VRU host or the user, namely, the social skills, attitude, and mood of other users at particular times. In addition, some users may lack the social or computing skills needed to generate an interesting time for themselves, yet are still interested in observing or learning about the interactions of others.

It is desirable, therefore, to resolve these problems and to provide user-supplied content within a VRU space that is less dependent on time and better organized for use by users within the VRU space.

SUMMARY

The present application discloses a method, system and apparatus for managing a multi-user animation process as described above, coupled with a text or speech-based bulletin board application. The bulletin board application receives text or speech input from multiple remote users in the VRU environment and publishes the input in a public forum database accessible to the forum. The bulletin board application maintains multiple forums organized by topic. Access or participation to particular forums is coordinated with the animation process, such that each user may be permitted access to a forum only when the user's avatar is located within a designated room or region of the modeled 3-D environment.

The electronic bulletin board coupled to the animation may include features that are presently familiar to users of such forums. Such boards may be implemented via a client/server arrangement wherein a host collects and distributes messages provided to the bulletin board by the group members. The host may function to organize messages according to topic and/or message thread, identify the source of provided messages and organize messages into message threads, enforce group membership limitations, distribute bulletin input to authorized clients in response to client requests, detect and flag or eliminate unauthorized content, and perform other functions.

However, the present bulletin board may include an interface and features not known in the art. For example, a bulletin board interface may be accessed via an object or region of VRU space. For more specific example, an interactive display window for a bulletin board may be accessed by clients via a modeled object in the space. The modeled object may be provided with a control feature that opens up the bulletin board window to a client when activated by avatar action with respect to the object. In the alternative, or in addition, the modeled object may provide the interface to selected clients when the respective client avatars are within a defined visual range of the object. For example, the modeled object may resemble a physical display screen displaying a bulletin board interface that becomes visible to avatars that place themselves in front of the screen.

The bulletin board may receive, organize and display text or audible voice messages in any suitable manner as known in the art. In addition, the bulletin board may collect, organize and distribute data using novel features. For example, the bulleting board may collect data using a virtual camera in the VRU space. That is, the VRU environment may be configured to provide users with a camera feature operative to record videos or photographs of events occurring in the VRU space. The recorded videos or photographs may be posted to a bulletin board, either under a topic suggested by a posting user, chronologically, or using some other organizing principle. For further example, the VRU environment may be configured to record text or voice chat data using a user-operated record feature. Recorded text or verbal chat may then be posted as bulletin board items, at the option of one or more contributing users. Other users of the space may be permitted access to the posted recordings at later times via a bulletin board display object.

In general, an important feature of the bulletin board-enabled VRU environment is the link between access to the bulletin board and some simulated physical object or space in the modeled VRU environment. The asset value of bulletin board, such as a value derived from its popularity or information value, may thereby become associated with an object or place in VRU environment. Conversely, the temporality of user experiences related to the VRU space may become moderated by the availability of stored information from the bulletin board.

A more complete understanding of the method and system for managing a VRU space to provide bulletin board and other content archiving will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIG. 3 is a schematic diagram showing aspects of a VRU environment with features for bulletin board services.

FIG. 4 is a block diagram showing aspects of a host system for managing a VRU environment to provide bulletin board services.

FIGS. 5A-C are exemplary simplified screenshots of user displays according to the inventions.

DETAILED DESCRIPTION OF VARIOUS EMBODIMENTS

Figure 1:
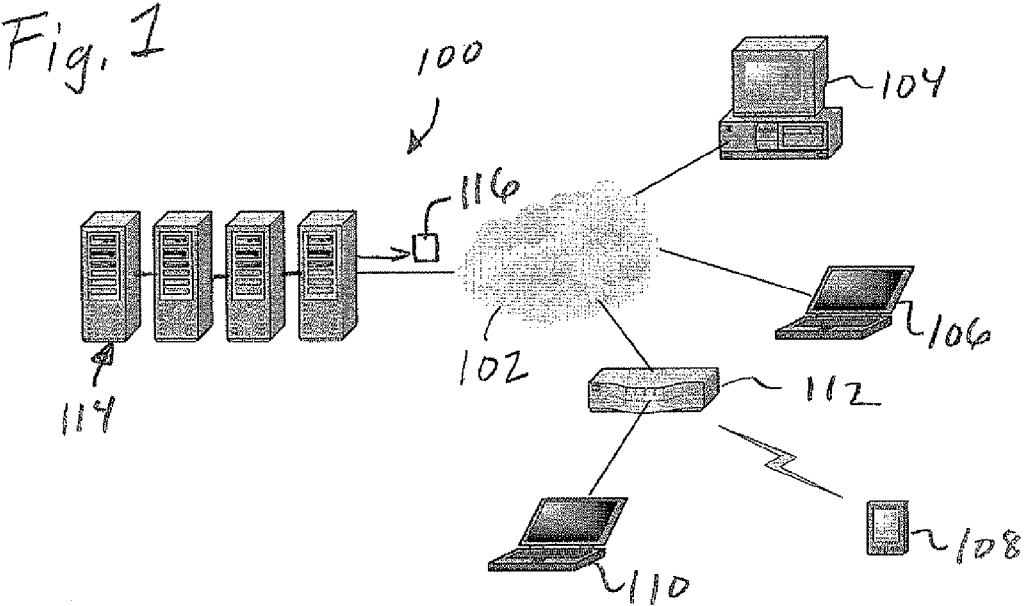
FIG. 1 is a schematic diagram showing a system for managing a VRU space to provide content archiving, and related client/network objects.

Referring to FIG. 1, a system 100 for providing a VRU to multiple users may comprise servers 114 configured to store and serve VRU data and software to client sites, for storing bulletin board data, and for running VRU and bulletin board processes. System 100 may communicate with a plurality of client sites, nodes or terminals, for example a personal computer 104, portable computers 106, 110, a compact player, cell phone or digital assistant 108, and/or router 112 communicating via a WAN 102 to one or more servers 114. Software or firmware working in cooperation with servers 114 may optionally be located at each client site. Generally, any number of clients may be communicating with servers 114 for participation in the VRU at any given time. In response to client inputs and other data, servers 114 generate output data 116 that is distributed to participating clients, which use the output data to generate coordinated views of a common VRU environment for use at each client site.

Figure 2:
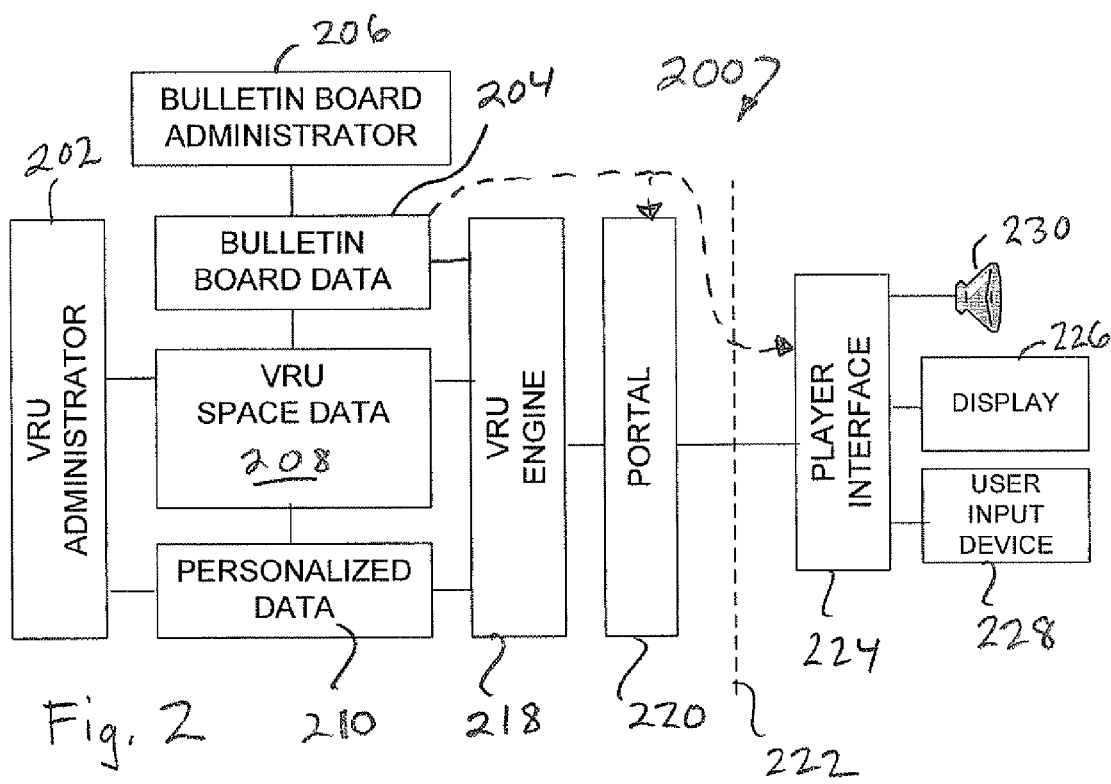
FIG. 2 is a schematic diagram showing a system for managing a VRU space to provide bulletin board services, and related external objects.

Referring to FIG. 2, a system 200 for providing a VRU according to the invention may be considered to be comprised of server-side components (to the left of dashed line 222), which as a group communicate with client-side components (to the right of dashed line 222) located at respective client sites. Client and server components may be coded in software and/or firmware using programming techniques known in the art to prepare components that function as described herein. Server-side components may comprise a portal 220 for managing connections to multiple simultaneous players. Portal 220 may interact with a VRU engine 218, passing user input from multiple clients to a VRU engine, and passing data from the VRU engine to respective individual players. VRU engine 218 may be operatively associated with various memory spaces, including VRU space data 208 holding data defining one or more modeled public spaces and objects making up the VRU environment, and a personalized data space 210 holding data personal to various clients, such as avatar and owned object data, user preferences and any other data that is wholly or partly client-determined and used in generating VRU scenes. As known in the art, objects in a VRU are modeled as three-dimensional objects, or two-dimensional objects, having a defined location, orientation, surface, surface texture, and other properties for graphic rendering or game behavior. VRU memory space 208 may hold active or inactive instances of defined spaces used in the VRU environment. For example, public roads, sidewalks, parks or other public spaces, private residences, and merchant-operated spaces may be simulated. The VRU engine may operate with other memory areas not shown in FIG. 2, for example various data libraries, archives, and records not inconsistent with the methods and systems disclosed herein.

Each user may customize an avatar to have an appearance and qualities specified by the user, by choosing avatar characters, features, clothing and/or accessories from an online catalog or store. The particular arrangement selected by a user may reside in a personalized space 210 associate with a particular user, specifying which avatar elements are to be drawn from a common space to construct an avatar. For example, a customized avatar instance may be stored in a personalized space for the user. In the alternative, or in addition, a user may own customized elements of an avatar, including clothing, accessories, simulated physical powers, etc., that are stored solely in the personalized space and are not available to other users. Avatars may move and interact both with common elements and personalized elements.

A separate administration module 202 may operate at the server level to create, update, modify or otherwise control the content of the VRU as defined in the memory areas 208 and 210. Generally, changes in the personal space area 210 are driven by individual users, either through the VRU administrator 202 or another module. Control of common areas, i.e., the game environment and the objects in it, including any multi-dimensional areas, may be provided to an authorized person via the administrator module 202.

System 200 may further comprise bulletin board data 204 linked via a suitable linking technique to VRU space data 208. For example, an object in the VRU data may include or be associated with a routine that calls up defined bulletin board data 204, which is then passed through the VRU engine 218 and portal 220 to a player interface 224. In the alternative, bulletin board data may be passed directly to portal 220 or player interface 224 using a separate server or data path. Even in this latter case, however, access to the bulletin board data 204 may require activating a predetermined trigger operating only in the VRU space via an object stored in the VRU data 208. Clients may therefore be prevented from accessing bulletin board data except through participation in the VRU environment hosted by VRU engine 218.

Presentation, storage, and organization of bulletin board data may be managed by a bulletin board administrative module 206, which may operate in coordination with the VRU engine 218, and/or separately. "Administrator" as used herein does not refer to a person to whom administrative functions are assigned, but instead refers to a software and/or firmware processing module that manages bulletin board data. In some embodiments, an administrator 206 may add recorded data from the VRU space (such as chat data, video data, or photographic data) directly from the VRU engine 218. In these embodiments, the bulletin board administrator may be configured to receive recorded data via a link activated through a modeled recording device in the VRU space, for example, a modeled camera or microphone. When the VRU engine detects that a modeled recording object is in use, it may provide a stream of recorded data to the bulletin board administrator 206 in a manner similar to, or the same as, a remote client, or via an internal path. The administrator may receive the incoming data, label it according to identifying data received from the VRU engine (for example, time, place, source, topic) and store the data as an audio-video clip, photo, text data, or other discrete package in a database of bulletin board data 204.

Although client initial access to the bulletin board data should require participation in the VRU environment operating on the engine 218, continuing access and use of the data may be handled either through the VRU environment, or separately. In some embodiments, the bulletin board administrator 206 may separately communicate with a player interface or even a general-purpose browser running on the client machine. In these embodiments, initial access to the bulletin board data may be restricted to clients participating in the VRU environment. However, once a connection to particular bulletin board server is established, continued access to the bulletin board data during any particular session may be maintained independently from operation of the VRU environment. For example, the bulletin board data may be accessed via a pop-up frame or window on the client that is independent of a frame or window in which the VRU environment is operating. Advantageously, this approach may be relatively easy to implement and may place comparatively lower demands on the VRU host resources. Disadvantageously, however, these embodiments do not readily provide a close association between the bulletin board data and the VRU environment.

In alternative embodiments, continued access to the data during any particular session may be maintained via the VRU environment. In these embodiments, the VRU engine 218 may be provided with an interface directly to the bulletin board administrator 206, such that clients gain continuing access to bulletin board data only via the VRU interface, either by providing special commands, controlling avatar actions in a specific way, or interacting with objects in the VRU environment. This may place additional loads on the VRU engine, but has the effect of tightly integrating the bulletin board content with the VRU environment. In these embodiments, data recorded in the VRU environment may likewise be provided to the bulletin board administrator via the VRU engine.

At the client level, a player interface module 224 may be installed to receive player inputs from one or more user input devices 228, such as a keyboard, mouse or other pointer, or microphone. The interface module may also provide data to the VRU engine 218 via portal 222, in response to the player input. The player interface module may also receive game data from portal 220 and process the data for display on display 226 and/or for audio output on speaker 230. Various systems and methods for providing a three-dimensional, multiplayer interactive animation to multiple players are known in the art, or may be adapted by one of ordinary skill for use with the invention. For example, rendering of a scene may be performed at the client or server level. Generally, it may be advantageous to perform calculations and graphics operations, to the extent possible, at the client level, thereby freeing up network bandwidth and minimizing loads on the server. The invention is not limited to a particular hardware or software architecture for carrying out the steps described herein.

FIG. 3 shows in schematic, simplified fashion a system 300 for providing a multi-user animation in coordination with a chat process, including an exemplary interface 302 that includes bulletin board data and an animated view of a VRU environment run by host 208. Interface 302 represents information that may be available to and viewed by multiple participants, for example, a first client 304 "Bob" and a second client 306 "Jane" communicating with each other via the host 308. The host manages communications to and from multiple clients, and serves each participating client with information for generating a personalized view of the environment. Each client receives this information and generates a view of the VRU environment, such as represented by window 311. The host may animate a first avatar 314 in response to input from the first client 304 and a second avatar 316 in response to input from the second client 301. While these avatars 314, 316 are in close proximity in the modeled virtual space (e.g., within a few virtual feet of each other), corresponding clients 304, 306 may receive information for generating a view of the VRU space in which both avatars appear. One such view is shown in window 311.

One or more selected VU environments may be configured to include a bulletin board access object 320, represented schematically in FIG. 3 as a rectangle 320 appearing in the primary window 311. The access object may comprise any suitable object for providing access to bulletin board data, including, for example, a control panel, a remote control, a simulated screen or projector, a wall, a region of modeled space, a simulated portable audio-visual device, or any suitable combination of such objects. By manipulating an avatar in proximity to an active access object, such as, for example, by moving the avatar to within a defined distance of the object or by "touching" the object, a client may gain access to a bulletin board interface 322. Using the interface 322, bulletin board data may be accessed by any client for whom the access object is operative, for example clients 304, 306.

The bulletin board interface may provide access to various types of archived data. For example, bulleting board data may include message data 324. Message data may comprise messages posted by clients of host 308 after gaining access to the interface. Such messages may be provided, for example, by receiving text messages contributed by participating clients. Messages may be organized in message threads including an original posting and all subsequent replies, according to organizing principles often used for organizing posted messages. Such messages may also include recorded audio clips, video clips, hyperlinks, or any other data capable of being uploaded to the bulletin board data via its user interface 322, retained as bulletin board data, and provided to clients as posted information.

Interface data 302 may also comprise a chat window 310 containing chat data 312 received in a chat session from participating clients, such as clients 302, 304. Any number of participants may provide text data to the chat session, with each contributed block of text labeled with an identifier 318 for its contributor. Blocks of text may be placed in chronological order and scrolled in the chat window 310. Further details of chat sessions as known in the art should be apparent to one of ordinary skill, and may be applied for use with the embodiments described herein.

Chat data as shown in window 310 may be archived and maintained in a bulletin board message recorded chat data 326 via a bulletin board interface. Recorded chat data is distinct from posted message data in that the recorded chat data originates in the VRU environment itself. While much of such data is of mere transitory interest, from time to time participating clients may generate chat data of more lasting interest. Via a bulletin board interface 320, such chat data may be recorded and included as a posting accessible via the bulletin board access object 320. Chat data may be arranged chronologically, by subject (topic), and/or by the identities of the participants in the respective recorded chat sessions.

The interface 320 may be configured so that chat sessions cannot be recorded in a bulletin board unless each participant in the session has provided some positive assertion of assent to the recording and posting of the chat session on the bulleting board. Assent or refusal may be determined in advance of the chat session, during the chat session, or afterwards. In the alternative, the interface may be configured so that the consent of all users is not required for a specific chat posting. Various functions may be used to automatically discern between more informative chat sessions and less informative sessions, which may be deleted from bulleting board data. 326. For example, chat sessions may be nominated by users and selected for posting only if one or more users provides input seconding the nomination. For further example, popularity of archived sessions may be tracked and used to rank chat data postings and to delete unpopular or unused postings. Posted chat data, therefore, may come to gradually comprise an organized archive of the most interesting chat sessions that have occurred in a particular VRU space or environment.

Similarly, simulated actions in a VRU space may be recorded together with, or separate from, chat data and posted as bulletin board data 328 via interface 322. Again, this recorded data originates from the VRU environment, including its avatars, as the environment responds to incoming data from multiple clients. At times this interaction may result in interesting, dramatic, aesthetically pleasing, historically significant, or other events that it is desired to record and post on the bulletin board for future access. Events may be recorded in using various different methods. One efficient technique may comprise simply recording a stream of output data provided to a selected participant in the recorded scene. If necessary, the data may be processed to remove any client-specific locks or limitations, so that the data can be used generally by multiple clients to recreate the recorded stream from the same perspective as the participant for which it was first generated. Multiple viewpoints of the same event may similarly be recorded. In addition, or in the alternative, sufficient input data may be recorded so that the scene may be recreated from multiple viewpoints, thus permitting future viewers of the data to select their desired viewpoint, or even to move though the scene as if they had been present in it. The resulting data may be characterized as animation data (input data for generating a VRU scene), audio-video data such as recorded by a virtual camera, still graphic images taken of the scene, or some combination of the foregoing. Such data may be posted to a linked bulletin board, organized, and managed in the manner described above for chat data.

FIG. 4 is a block diagram showing exemplary components of a system 400 for providing a multi-user animation process in conjunction with a bulletin board process. A host process 402 may be configured and installed on any suitable host and connected to a network for communicating with multiple remote clients providing various inputs, including user commands 404. A suitable host may include, for example, a network-connected server or server bank specialized for hosting simultaneous multi-user animation processes. In the alternative, or in addition, a host may include or reside entirely client-side resources, as in a decentralized, peer-to-peer system. The specific host configuration shown in FIG. 4 is not specific to either server or peer-to-peer implementations, and provides a merely exemplary configuration of components for the host process.

User commands may comprise binary coded data generated by a client-side application in response to user inputs to a client terminal (e.g., keystrokes or pointer movement), and may be transmitted to the host using any suitable protocol, for example, TCP/IP, transmitted by a carrier signal over a wide area network, such as the Internet. User commands may include commands directing motion and movement of one or more avatars controlled by each respective client station, commands for controlling or interacting with control interfaces or with other interactive objects in a multi-user remote animation. In general, such commands here encompass client input that is used to influence or control events that occur in an instance of a modeled VRU environment of the host process 402. User or client commands, as used herein, exclude client input that is used for other purposes besides as input to an animation process. There can, of course, exist or be developed an arbitrarily large diversity of commands using software and hardware tools, programming languages and techniques as known in the art.

The host process 402 should include a command interface process 406 for receiving and processing user commands. Again, various communication interfaces are known in the art for receiving input simultaneously (or near-simultaneously) from multiple sources. Input, including user commands, may be received and processed serially without losing a desired degree of simultaneity by providing sufficient bandwidth and processing power in the command interface 406. Standard techniques as known in the art may be used to build scaleable processing power, including load balancing. Development of an interface process 406 for processing command input should therefore be a matter of ordinary skill, depending on a defined command set for a given VRU environment and configuration of host 402. More generally, functions of the command interface may include receiving user commands 404 and processing the user commands to create command input for VRU animation and configuration processes. Processing may include parsing an input stream of user commands, translating user commands into command signals more directly usable by internal host processes, addressing the translated command signals, and transmitting or otherwise distributing the command signals to other host processes. Rapid processing of commands from a large plurality of client devices is desirable to achieve rapid response of hosted animation instances.

The host processes 402 may include intermediate processes 410, 412 for providing input to a core animation/aggregation process 408. A VRU manager 410 may manage host-side features of the VRU, including, for example, common features, topography, textures, rule sets, passive objects, interactive objects, and other programmed objects used in creating and generating VRU scenes. As complexity and detail are added to a VRU, these host-side features may accrue in a massively scaleable database of VRU data, only a small fraction of which may be needed for the core animation process 408. In response to input from the command interface 410, animation process 408, or both, the VRU manager 410 may operate to create and extinguish instances of multi-participant animation processes, create and update objects stored in the VRU database 414, coordinate communications with the animation process 408, initiate and direct animation processes, and/or coordinate communications with a bulletin board process 416 or other auxiliary process.

An avatar manager 412 may be provided to manage configuration and control of avatar data and other data objects that are assigned stable properties or functions in response to user input. For example, input from remote clients may be used to determine gender and racial characteristics of each avatar, with each client specifying its own avatar characteristics. Modeled objects, such as modeled clothing, tools, vehicles, and the like assigned for control by specific clients may be handled with avatar data. The avatar manager 412 may function to manage creation and maintenance of the client-determined configuration data for objects and avatars stored in a database 418. In addition, the process 412 may communicate with the VRU manager 410 and/or an animation process 408 to ensure that the configurations of avatars and other client-controlled avatar data are in accordance with the configurations specified by user command 404.

VRU data 414 may include configurations for interactive objects that control access to stored bulletin board data 420 via a manager process 416. In some embodiments, the VRU manager may be configured to detect when an avatar interacts with one of these interactive objects. When interaction is detected, the VRU manager may provide a signal to the bulletin board manager 416, causing the manager to provide defined bulletin board data 422 out to the remote client that caused the avatar interaction with the interactive object. For example, the bulletin board manager 416 may serve a window or link to the indicated client, via which the client may directly access the postings in the bulletin board data. In the alternative, or in addition, the bulletin board manager may provide bulletin board data via a host animation process 408. For example, a display screen object in VRU data 414 may be configured to call a view of bulletin board data, which supplied from the database 420 may be rendered as a texture in a host or client rendering process directed via the host animation process.

Presentation of bulletin board data generally relies on extensive placement of hyperlinks in the data to facilitate navigation through various postings. When bulletin board data is directly served via an independently served window or frame, hyperlinking may be accomplished in a conventional fashion. However, if bulleting board data is presented as a texture in a modeled environment prior to rendering, traditional hyperlinks will not operate. In such embodiments, hyperlinks may be inserted as interactive objects in the modeled environment. For example, a display screen may include interactive control button objects that, activated by an avatar action or user command, cause the display to change in accordance with a navigation command associated with the modeled interactive button. In this example, the control button object when activated signals the bulletin board manager to refresh a displayed interface for bulletin board data according to any suitable navigation command, for example scroll, drill down, page back or forwards, hyperlink, and so forth. Thus, the VRU manager and bulletin board manager may emulate a bulletin board interface rendered from the three-dimensional modeled environment of the VRU.

The bulletin board manager 420 may also interface with the VRU manager 410 and animation process 408 to receive recorded data from the animation process and store the recorded data as a posting in the bulletin board database 420. The bulletin board manager may organize the recorded data according to location and time information out of the animation process, client-supplied topical information, topical classification inferred from contextual or content clues, or some combination of the foregoing. Receipt and archiving or recorded data may be initiated via an interactive VRU object, i.e., a virtual recorder. When activated, the virtual recorder object causes implementation of a process routine for recording video, audio, or still photographic data from an animation process 408. Parameters governing the capture of data, e.g., viewpoint, viewing angle, etc., may be determined automatically from the virtual recorder's position and orientation in the VRU space, or may be manually set using client input.

Similarly, the bulletin board manager 416 may communicate with a chat process manager 424 to effect copying of recorded chat data 426 to a more permanent bulletin board archive 420, organized according to time & location of avatars engaged in the chat, topic, keyword, or some combination of these or other suitable labels for chat content. The chat process 424 may be initiated by an interaction of avatars in a defined region or room of the VRU space, but may be managed separately. For example, the chat process may receive incoming chat data 428 and serve outgoing data 430 to participants in a chat process independently of the animation process 408, such as in a separate window. A link may nonetheless be maintained between each chat session between remote clients and an animation session in which those avatars are participating. For example, access to a chat session may be enabled when an avatar enters a modeled room, while access may be terminated when the avatar leaves the room.

Chat data 426 may generally be disposed of after a relatively short period of time (e.g., less than an hour or less than a day) after a chat is completed, immediately when a chat session is terminated, or when a chat buffer for a particular chat session is exceeded. Markers, for example timestamps or manual bookmarks, may be placed in chat data to mark intervals. Via an interactive object in the VRU space, or through a separate command interface in communication with the chat process, the chat process 424 or bulletin board process 416 may receive client input indicating that a specified interval of chat data is to be added to the bulletin board database. For example, participants in a chat session may vote to promote an interval of chat data to a bulletin board posting. Consent to promotion of the interval may be requested from all participants, from at least one participant, or accomplished without the consent of participants by process 416 or 424.

As mentioned above, bulletin board data may be served independently to clients as shown at data 422, or combined (e.g., as an object texture) with VRU objects processed in the animation process 408 and output with animation data 432. Such animation data may comprise fully rendered frame views or VRU object information for rendering at the client side. An output control process 434 may be use to distribute output data efficiently to various different clients participating in a particular VRU instance.

FIG. 5A shows an exemplary screenshot

Figure 6:
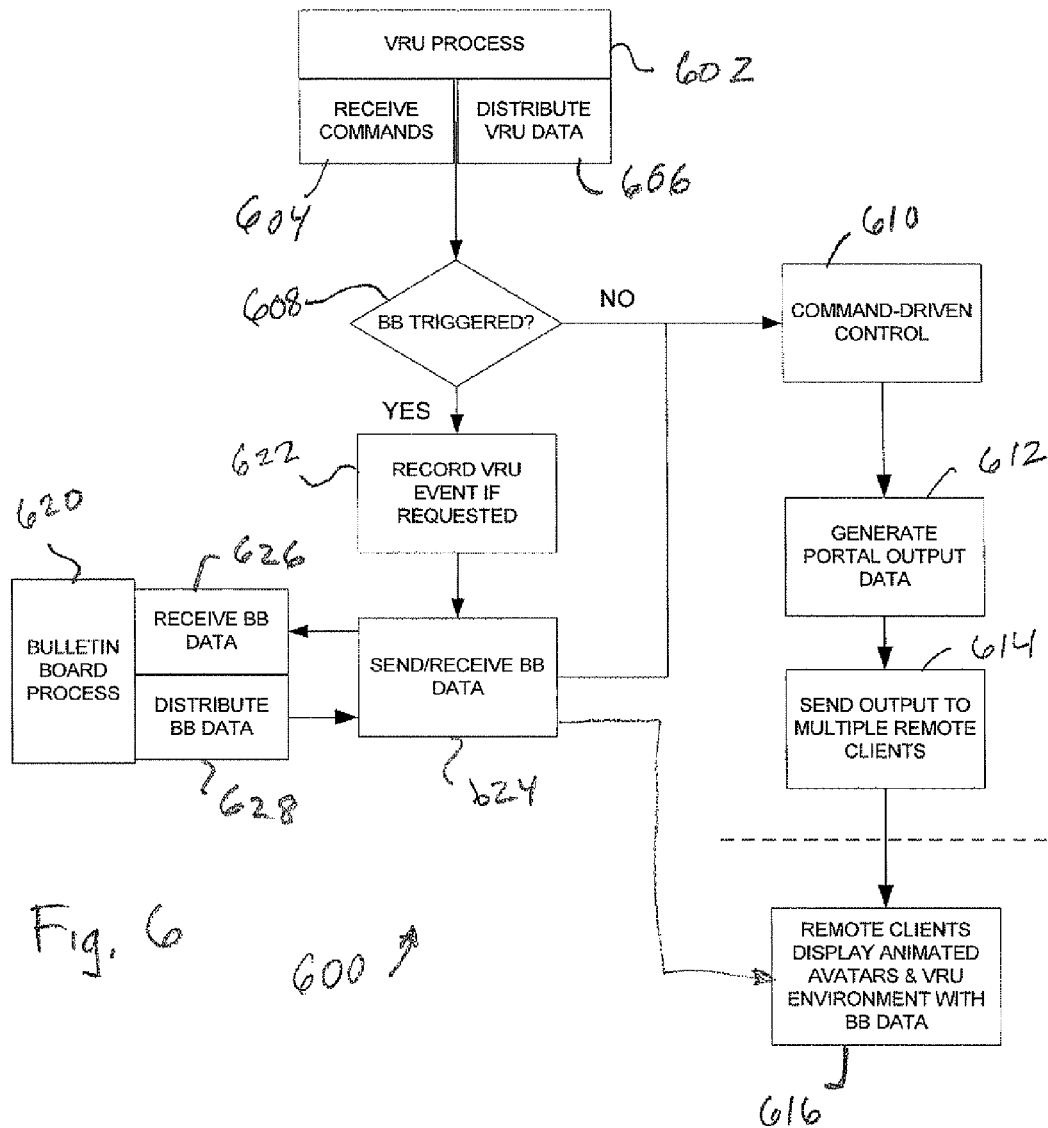
FIG. 6 is a flow diagram showing exemplary steps of a method for managing a VRU environment to provide bulletin board services.

FIG. 6 show exemplary steps of a method 600 for user-selected data archiving in a multi-user VRU environment. At step 602, a VRU process is operated comprising sub-steps of continuously receiving client commands 604 and distributing resulting VRU data of an animated VRU environment to participating clients 606. The VRU process may include a step of monitoring client input and a current state of a modeled scene to determine whether any command has been received, or any event occurred in the space, to trigger initiation of a bulletin board process 608.

At times when a bulletin board event is not triggered, the animation may proceed using client commands and an environmental rule set to control animation progress, at 610. This step may occur in an animation/aggregation process as diagrammed in FIG. 4 at 408. Referring again to FIG. 6, at periodic intervals (for example, each $\frac{1}{24}$ of a second) animation output data may be distributed by an output control process as shown at 612, which transmits the output data to the multiple remote clients participating in the VRU instance at 614. On the client side, each client may receive the animation data and display it at 616, after a rendering or other initial processing, on a display device such as a video monitor, television, video screen, or the like. Steps 610, 612 and 614 (herein referred to in combination and "the VRU transmission path") may be generally used to handle data originating from VRU process 602 and bulletin board process 620. In the alternative, the VRU transmission path may handle data originating from the VRU process 602 exclusive of data originating from the bulleting board process 620. In the latter case, bulletin board data may be transmitted via an alternative pathway, such as via a TCP/IP network to remote clients.

Referring back to step 608, client input may be received that indicates a request to access a bulletin board process. The input may take the form of a direct request, such as a text command or client activation of a control button. In the alternative, or in addition, the client input may be indirect, such as controlling an avatar to within a defined proximity of a designated modeled object in the VRU environment. Any event occurring in the VRU environment may be used to trigger access to a bulletin board process. Triggering events may be defined so that by avatar actions, such as, for example, walking in front of a bulletin board display screen, or activating a control panel in the VRU environment by approaching or touching it.

When a triggering event occurs, or a designated client command is received at 608, a VRU recording routine 622 may be initiated. The recording routine may be configure to initiate storage of animation, chat, audio, graphic image, or video data being output from the VRU process 602. More detailed examples of recorded data types have been provided earlier in the specification. The recording process 622, or a cooperating process, may label the recorded data with parameters such as VRU time and location, client names or avatar names included in the recording, one or more contextual subjects, or keywords. Recorded data may be cached for longer-term storage by bulletin board process 620 or streamed to process 620 on a real-time or near real-time basis.

In the alternative, or in addition, client input data may be recorded for sending to the bulletin board process 620 in a process that is separate from the VRU environment. For example, a separate message window may be served to a participating client, via which the client may submit text messages or other data for posting on the bulletin board. Even so, it may be desirable to coordinate such a relatively independent process with the VRU. For example, a bulletin board messaging window may be made active for a particular client only when the client's avatar is in a designated room or area of the VRU. When the avatar leaves the room or area, the messaging window may be closed.

At any suitable time after a recording process 622 is initiated, a VRU-coordinated communication process 624 may send recorded data from the VRU environment or client-provided bulletin board message data to a bulletin board process 620. The bulletin board process may be configured to provide conventional features of bulletin boards, including but not limited to a database of posted items and an interactive interface page via which remote users can view and access posted messages. In addition, the bulletin board process

Having thus described embodiments of a method and system for a multi-user animation process linked to a bulletin board, it should be apparent to those skilled in the art that certain advantages of the within system have been achieved. It should also be appreciated that various modifications, adaptations, and alternative embodiments thereof may be made within the scope and spirit of the present invention. For example, a method implemented over a public network such as the Internet has been illustrated, but the inventive concepts described above would be equally applicable to implementations over other networks. The invention is defined by the following claims.

What is claimed is:

1. A method for user-selected data archiving in a multi-user virtual reality universe (VRU) environment, comprising:
   modeling a VRU in a computer memory, the VRU comprising a computer model of a physical, three-dimensional space including modeled avatars each controlled in response to avatar control input from corresponding ones of a plurality of separate remote clients;
   modeling a data access object in the computer memory with the VRU, the data access object comprising at least one programmed function responsive to the avatar control input to provide a data access signal;
   in response to receiving a data access signal provided by the data access object, providing an interface for a separate bulletin board application to selected ones of the remote clients, the bulletin board application operative to provide access to archived data contributed by its subscribing users; and
   modeling a data recording object in the VRU, the data recording object comprising at least one programmed function responsive to control input from the corresponding ones of the plurality of remote clients to provide a data record signal initiating obtaining of recorded chat or animation data from the VRU for including in the archived data.

2. The method of claim 1, further comprising, in response to receiving a data record signal from the data recording object, recording a designated temporal portion of VRU animation data within a defined proximity of the data recording object to obtain the recorded animation data comprising a record of a VRU event.

3. The method of claim 1, further comprising adding the recorded data to the archived data.

4. The method of claim 3, further comprising organizing the archive data relative to VRU model data.

5. The method of claim 1, further comprising, in response to receiving the data record signal from the data recording object, providing designated chat data for addition to the archived data.

6. The method of claim 5, further comprising limiting the designated chat data to chat data received from ones of the plurality of separate remote clients who have consented to addition of the chat data to the archived data.

7. A multi-user animation method, comprising:
   receiving input from multiple remote clients to manipulate avatars through a modeled 3-D environment;
   maintaining an association between each of the multiple remote clients and corresponding ones of the avatars;
   providing 3-D environment and time-dependent data for respective modeled avatars to client workstations formatted to facilitate display of a simulated environment visible to the multiple remote clients; and
   providing a link to a separate bulletin board application, the link formatted as a modeled object in the modeled 3-D environment operative to grant access to the bulletin board application for the multiple remote clients in response to input from the multiple remote clients for manipulation of the avatars in the modeled 3-D environment; and
   providing a data recording object to appear in the 3-D environment, the data recording object comprising at least one programmed function responsive to control input from the corresponding ones of the remote clients to initiate obtaining of recorded chat or animation data from the modeled 3-D environment to create archived data for access via the bulletin board application.

8. The method of claim 7, further comprising receiving input from the multiple remote clients at a host operating the bulletin board application, and publishing the input in a forum available to the multiple remote clients.

9. The method of claim 7, further comprising organizing the input into multiple forums by topic.

10. The method of claim 7, further comprising providing the link the bulletin board application, such that each client is permitted access the bulletin board application only when the each user's avatar is located within a defined spatial portion of the modeled 3-D environment.

11. The method of claim 7, further comprising providing the link the bulletin board application, such that each user is permitted access to the bulletin board application only when the each user's avatar is performs a defined action relative to a designated modeled object in the modeled 3-D environment.

12. The method of claim 7, further comprising transmitting data recorded from the modeled 3-D environment to the bulletin board application for posting in bulletin board data.

13. A method for managing an electronic bulletin board, comprising:
    communicating with a database of client-submitted electronic content to thereby provide access to bulletin board data stored in the database for a plurality of remote clients;
    communicating with a virtual reality universe (VRU) host operating a multi-user modeled environment in which remote clients provide input for manipulation of modeled avatar objects in a modeled three-dimensional computer-generated multi-user animation to receive requests for access to the bulletin board data from the VRU host, wherein the VRU host is separate from the database containing the bulletin board data and provides a data recording object in the modeled environment comprising at least one programmed function responsive to control input from corresponding ones of the remote clients to initiate obtaining of recorded chat or animation data items from the modeled environment for including in the bulletin board data; and
    providing the bulletin board data in response to the requests from the VRU host.

14. The method of claim 13, further comprising receiving the recorded data items from the VRU host, each data item associated with a time and place of the multi-user modeled environment.

15. The method of claim 14, further comprising organizing the recorded data items in the database according to each associated time and place.

16. The method of claim 13, further comprising providing the bulletin board data to the VRU host formatted for display in the multi-user modeled environment.

17. The method of claim 13, further comprising providing the bulletin board data directly to individual ones of the plurality of remote clients as identified by the VRU host.

18. A computer-readable memory encoded with instructions for user-selected data archiving in a multi-user virtual reality universe (VRU) environment operable for:
    modeling a VRU environment in a computer memory, comprising a computer model of a physical, three-dimensional space including modeled avatars each controlled in response to avatar control input from corresponding ones of a plurality of separate remote clients;
    modeling a data access object in the computer memory with the VRU environment, the data access object comprising at least one programmed function responsive to a defined avatar action with respect thereto to provide an interface for a separate bulleting board application to ones of the remote clients providing control input to effect the defined avatar action, wherein the bulletin board application is operative to selectively provide access to archived data contributed by its subscribing users; and
    modeling a data recording object in the computer memory with the VRU environment, the data recording object comprising at least one programmed function responsive to control input from ones of the plurality of remote clients to provide a data record signal initiating obtaining of recorded chat or animation data from the VRU environment for including in the archived data.

19. The memory of claim 18, the instructions further operable for requesting addition of the recorded data to the archived data for the bulletin board.

20. The memory of claim 18, the instructions further operable for, in response to receiving a data record signal from the data recording object, providing designated chat data between different ones of the plurality of remote clients for addition to the archived data.

21. A computer-readable memory encoded with instructions for performing a multi-user animation, the instructions configured for:
    receiving input from multiple remote clients to manipulate avatars through a modeled 3-D environment;
    maintaining an association between each of the multiple remote clients and corresponding ones of the avatars;
    providing 3-D environment and time-dependent data for respective modeled avatars to client workstations formatted to facilitate display of a simulated environment visible to the multiple remote clients; and
    providing a link to a separate bulletin board application, the link formatted as a modeled object in the modeled 3-D environment operative to grant access to the bulletin board application for the multiple remote clients in response to input from the multiple remote clients for manipulation of the avatars in the modeled 3-D environment, and
    providing a data recording object in the 3-D environment comprising at least one programmed function responsive to control input from ones of the multiple remote clients to provide a data record signal initiating obtaining of recorded chat or animation data from the 3-D environment for including in archived data for access via the bulletin board application.

22. The memory of claim 21, the instructions further configured for providing the link to the bulletin board application, such that each client is permitted access to the bulletin board application only when its corresponding avatar is located within a defined spatial portion of the modeled 3-D environment.

23. The memory of claim 21, the instructions further configured for providing the link the bulletin board application, such that each client is permitted access to the bulletin board application only when its corresponding avatar performs a defined action relative to a designated modeled object in the modeled 3-D environment.

* * * * *